United States Patent
Cui

(10) Patent No.: US 12,448,006 B2
(45) Date of Patent: Oct. 21, 2025

(54) PREDICTING AND CONTROLLING OBJECT CROSSINGS ON VEHICLE ROUTES

(71) Applicant: Motional AD LLC, Boston, MA (US)

(72) Inventor: Henggang Cui, Allison Park, PA (US)

(73) Assignee: Motional AD LLC, Boston, MA (US)

( * ) Notice: Subject to any disclaimer, the term of this patent is extended or adjusted under 35 U.S.C. 154(b) by 279 days.

(21) Appl. No.: 17/705,035

(22) Filed: Mar. 25, 2022

(65) Prior Publication Data

US 2023/0303124 A1    Sep. 28, 2023

(51) Int. Cl.
*B60W 60/00*        (2020.01)
*B60W 50/00*        (2006.01)
*G05B 13/02*        (2006.01)

(52) U.S. Cl.
CPC .... *B60W 60/0027* (2020.02); *B60W 50/0097* (2013.01); *G05B 13/0265* (2013.01); *B60W 2050/0028* (2013.01); *B60W 2420/403* (2013.01); *B60W 2420/408* (2024.01); *B60W 2554/4041* (2020.02); *B60W 2556/50* (2020.02); *B60W 2720/10* (2013.01); *B60W 2720/24* (2013.01)

(58) Field of Classification Search
CPC ........ B60W 60/0027; B60W 50/0097; B60W 2050/0028; B60W 2420/403; B60W 2556/50; G05B 13/0265
See application file for complete search history.

(56) References Cited

U.S. PATENT DOCUMENTS

| | | | |
|---|---|---|---|
| 10,899,345 B1* | 1/2021 | Ferguson | B60W 30/0953 |
| 2019/0061748 A1* | 2/2019 | Baba | G08G 1/166 |
| 2020/0272148 A1 | 8/2020 | Karasev et al. | |
| 2021/0162994 A1 | 6/2021 | Shalev-Shwartz et al. | |
| 2021/0347383 A1* | 11/2021 | Siebert | G01C 21/3407 |
| 2022/0266871 A1* | 8/2022 | Hayashi | B60W 40/04 |
| 2022/0363247 A1* | 11/2022 | Hendy | G08G 1/161 |
| 2023/0215273 A1* | 7/2023 | Yamauchi | G06V 20/64 |

FOREIGN PATENT DOCUMENTS

WO    WO 2021/225822    11/2021

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

* cited by examiner

*Primary Examiner* — Jelani A Smith
*Assistant Examiner* — Toya Pettiegrew
(74) *Attorney, Agent, or Firm* — Fish & Richardson P.C.

(57) ABSTRACT

Provided are methods, systems and computer program products for predicting vehicle crossing and yielding, which can include receiving sensor information indicating an object surrounding a vehicle. Some methods also include determining a future position of the vehicle based on a first trajectory of the vehicle, determining a future position of the object based on a second trajectory of the object, and determining a vehicle control based on the future position of the vehicle and the future position of the object. The methods also include training a model using the vehicle control, the first trajectory of the vehicle, and the second trajectory of the object.

20 Claims, 6 Drawing Sheets

PREDICTING AND CONTROLLING OBJECT CROSSINGS ON VEHICLE ROUTES

BACKGROUND

An autonomous vehicle is a vehicle that is capable of sensing its environment and navigating without human input. Autonomous vehicles have multiple types of sensors onboard that perceive the surrounding environment and provide the autonomous vehicle with data representative of the surrounding environment. The autonomous vehicle uses machine learning models to process or compute the data and make movement decisions based on the results of the computations, which can include predictions on whether other actors in the autonomous vehicle's environment cross the route of the autonomous vehicle.

DETAILED DESCRIPTION

Figure 1:
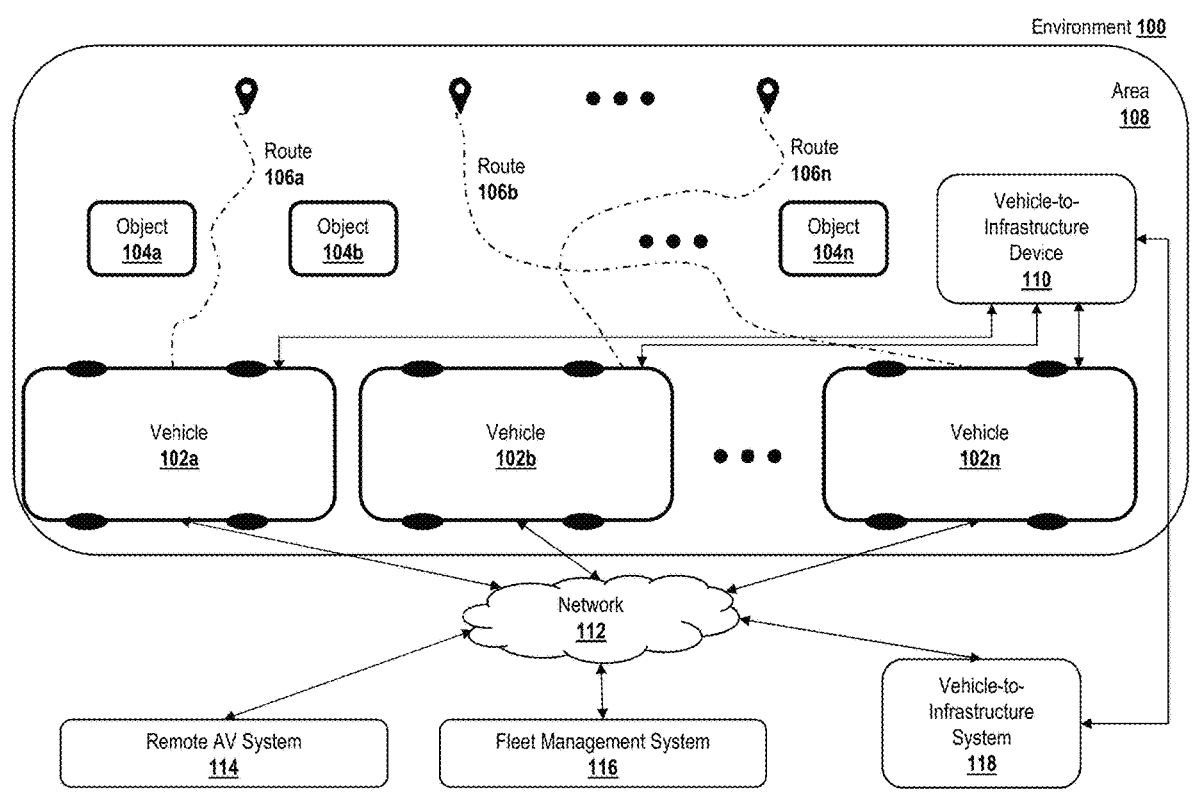
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement predicting and controlling object crossings of vehicle routes. In some embodiments, a vehicle (e.g., autonomous vehicle) predicts or determines whether an object crosses a vehicle's route or yields to the vehicle, determines a vehicle control for maintaining or adjusting the vehicle's movement based on the trajectories of the object and the vehicle, and trains a model (e.g., machine learning model) based on the trajectories and the vehicle control. For example, the vehicle is provided with information as to whether an object that is detected in the surrounding environment of the vehicle is going to cross in front of the vehicle or yield to the vehicle. The information is based on determining the trajectories and associated timestamp information for the vehicle and for the object. The determination of the crossing or yielding includes detecting false positives to filter out such results and improve the accuracy of the object movement detection to train a model accordingly.

For instance, the vehicle's sensors detect the presence of an object as well as movement data of the object that the vehicle can use to predict the trajectory of the object for a given horizon or time duration. The vehicle also determines its own trajectory over the same duration and predicts whether the object crosses the vehicle's route or yields to the vehicle. The object crosses the vehicle's route when the future positions of the object and the vehicle intersect and the object passes through the intersection prior to the vehicle. The object is said to yield to the vehicle when the future positions of the object and the vehicle intersect and the vehicle passes through the intersection prior to the object.

In some embodiments, the vehicle determines the actual or "ground truth" trajectories of the object and the vehicle and compares these trajectories with the respective predicted trajectories to identify any false positive or false negative object crossings. A false positive object crossing refers to the scenario where the predicted trajectories of the object and the vehicle indicate that the object crosses the vehicle's route while the ground truth trajectories of the object and the vehicle indicate the opposite, and a false negative object crossing refers to the scenario where the predicted trajectories indicate that the object does not cross the vehicle's route while the ground truth trajectories indicate that the object does cross the vehicle's route. The predicted trajectories with the identified false positive crossings and false negative crossings are filtered out, and a model (e.g., a machine learning model) is trained using the predicted and/or the ground truth trajectories to make improved predictions about object and/or vehicle trajectories and whether the object crosses the vehicle or yields to the vehicle.

In some embodiments, the vehicle determines a vehicle control to control the vehicle's movement based on the predicted trajectories of the vehicle and the object. The vehicle control includes but is not limited to changing or maintaining the velocity of the vehicle (e.g., to avoid collision, i.e., to avoid arriving at the intersection location at the same time or substantially the same time as the object). The model is then trained with the predicted trajectories of the object and/or the vehicle and the vehicle control to make improved predictions about object and/or vehicle trajectories and whether the object crosses the vehicle or yields to the vehicle.

By virtue of the implementation of systems, methods, and computer program products described herein, techniques for predicting and controlling object crossings of vehicle routes use the trajectories and timestamp information of a vehicle and an object to allow a more accurate determination of vehicle responsiveness to the possibility of the object crossing the vehicle's route. The additional consideration of the timestamp information also helps in determining whether the object crosses the vehicle's routes, as well as in determining false positive object crossings. Such determinations allow the vehicle to adjust its direction (e.g., steering angle, lane, etc.), speed, etc., thereby enhancing vehicle and object safety.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1.

Additionally, or alternatively, at least one set of elements of environment 100 can perform one or more functions described as being performed by at least one different set of elements of environment 100.

Figure 2:
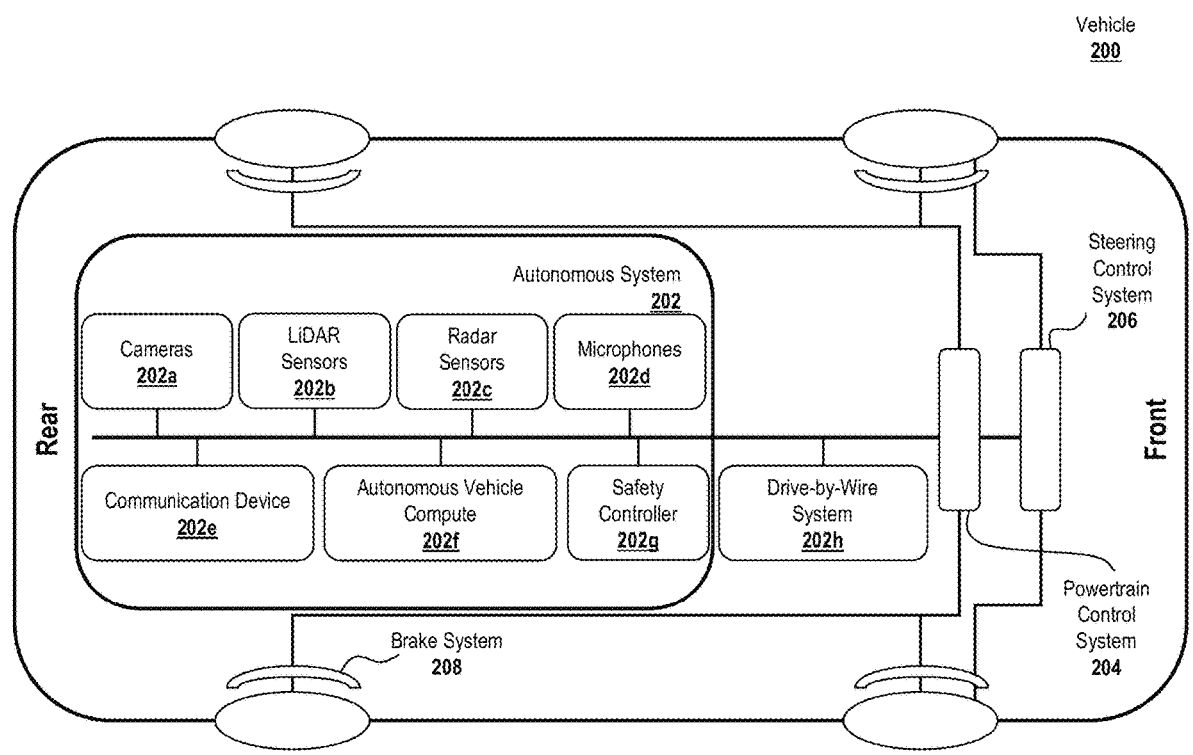
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
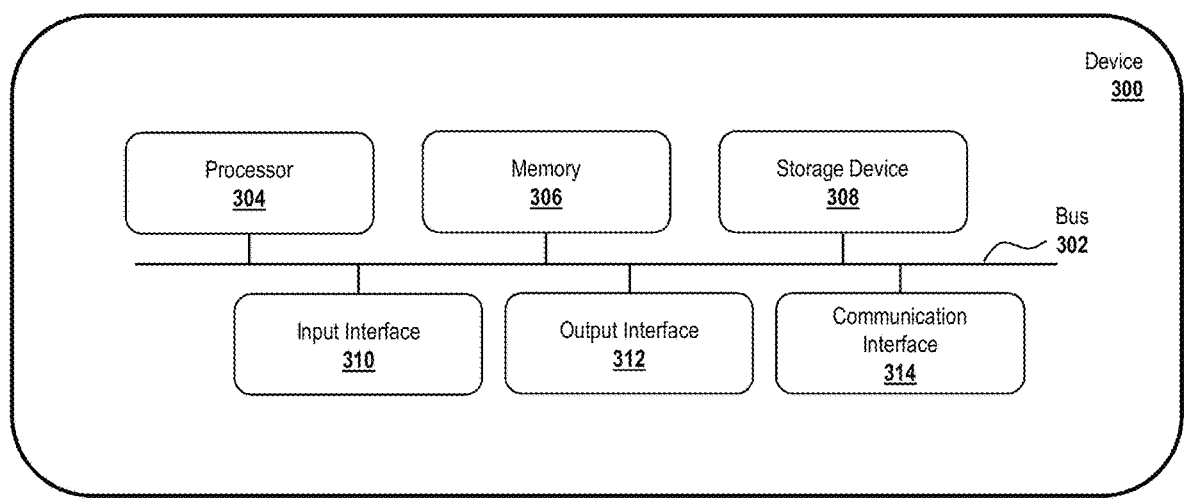
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data (TLD) associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102 such as but not limited to autonomous system 202), and/or one or more devices of network 112 (e.g., one or more devices of a system of network 112). For example, in some embodiments, one or more devices of vehicles 102 (e.g., one or more devices of a system of vehicles 102 such as but not limited to autonomous system 202), and/or one or more devices of network 112 (e.g., one or more devices of a system of network 112) include at least one device 300 and/or at least one component of device 300.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments, input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
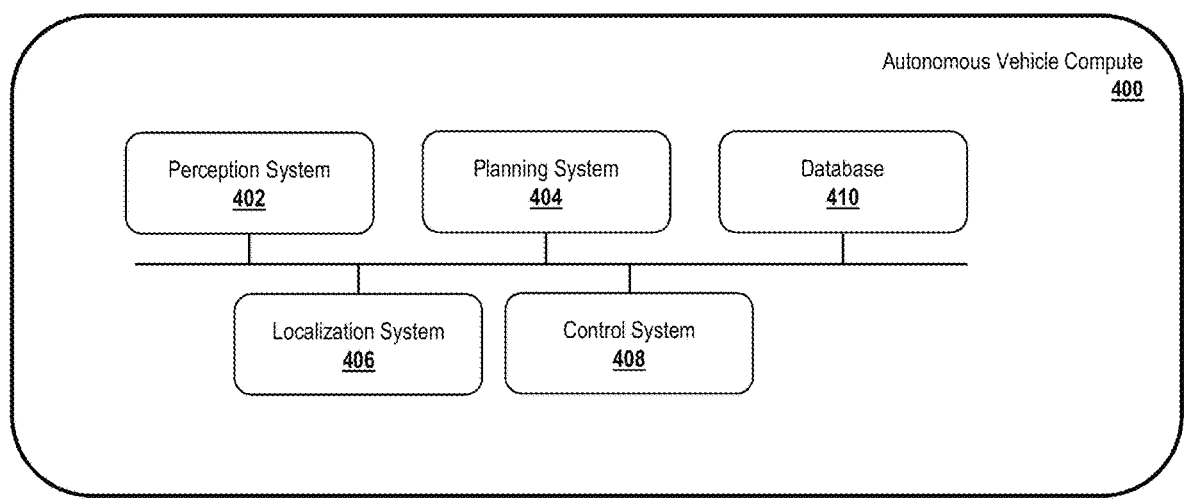
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
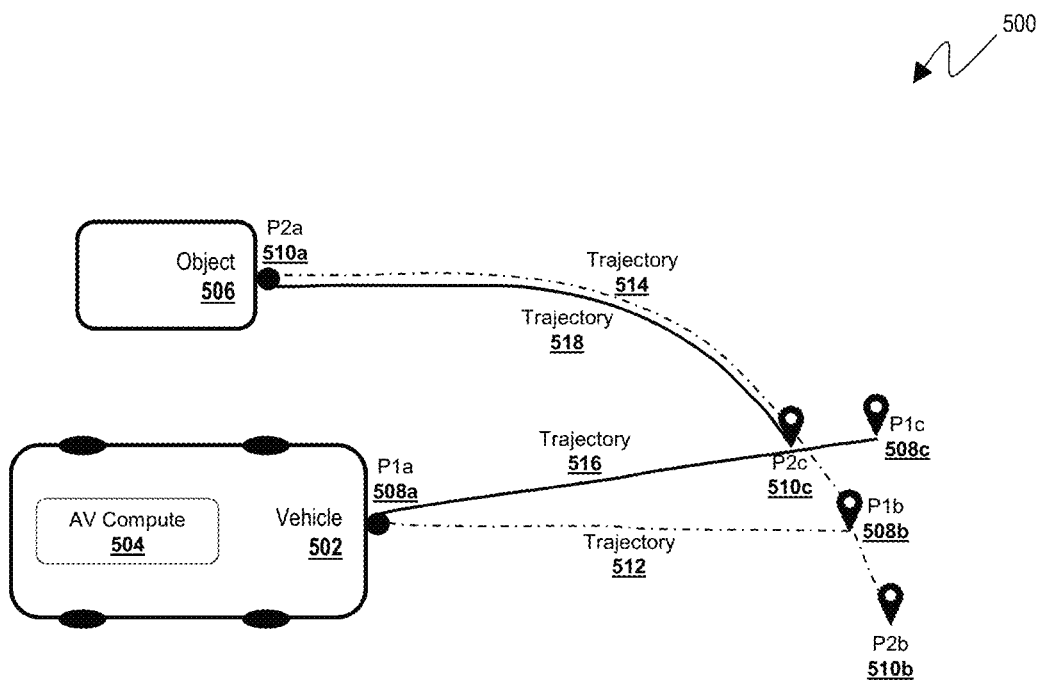
FIG. 5 is a diagram of an example of a process for predicting and controlling object crossings of vehicle routes.

Referring now to FIG. 5, illustrated is a diagram of an implementation 500 of a process for predicting and controlling object crossings on vehicle routes. In some embodiments, implementation 500 includes vehicle 502 including the autonomous vehicle compute 504, and vehicle 506. In some embodiments, vehicle 502 is the same as or similar to vehicle 102a-102n or vehicle 200, autonomous vehicle compute 504 is the same as or similar to autonomous vehicle compute 202f, 400, and object 506 is the same as or similar to objects 104a-104n.

In some embodiments, vehicle 502 has a sensor suite that allows the vehicle to gather sensor information about the environment surrounding vehicle 502. For example, vehicle 502 can include devices such as but not limited to imaging devices (e.g., cameras), LiDAR sensors, radar sensors, microphones, GPS, etc., that gather sensor information about object 506 that is surrounding vehicle 502. The sensor information can include captured images and/or point could images of object 506 and the surrounding environment that are captured by the imaging devices and/or the LiDAR sensors, respectively, on the vehicle 502. Other examples of sensor information include radar signals representing object 506 that are generated by the radar sensors in response to radio waves transmitted by the radar sensors towards object 506. The object can be a vehicle, a pedestrian, a cyclist, and/or the like.

In some embodiments, AV compute 504 of vehicle 502 predicts (e.g., using a ML model therein) trajectory (e.g., alternatively referred to as route) 512 of vehicle 502 and trajectory 514 of object 506 based on the sensor information received from the sensor suite of vehicle 502. In some instances, AV compute 504 predicts trajectory 512 and trajectory 514 for a pre-determined time horizon, which can be in the range from about 2 sec to about 16 sec, from about 4 sec to about 12 sec, from about 6 sec to about 10 sec, about 8 sec, including values and subranges therebetween, and continue to do so periodically with a period at least sub- stantially equal to the pre-determined time horizon. For example, if the pre-determined time horizon is about 8 sec, AV compute 504 predicts trajectory 512 and trajectory 514 for 8 sec, and continue to update or predict trajectory 512 and trajectory 514 every 8 seconds.

In some embodiments, trajectory 512 and trajectory 514 include velocity vectors of vehicle 502 and object 506, with the velocity vectors indicating the speed and direction (e.g., heading angle) of the movement of vehicle 502 and object 506 from starting spatiotemporal location P1a 508a and starting spatiotemporal location P2a 510a, respectively. Spatiotemporal locations include positions of vehicle 502 or object 506, and in some instances, timestamps of the same at those positions. Based at least in part on trajectory 512 and trajectory 514, AV compute 504 can determine future spatiotemporal locations of vehicle 502 and object 506, respectively. For example, AV compute 504 can calculate, based at least in part on trajectory 512 and trajectory 514, future positions, and timestamps thereof, of vehicle 502 and object 506 when the respective trajectories or routes intersect. With reference to FIG. 5, AV compute 504 can determine future spatiotemporal locations P1b 508b and P2b 510b of vehicle 502 and object 506, respectively, when trajectory 512 and trajectory 514 intersect.

The positions of the spatiotemporal locations of vehicle 502 and object 506 along trajectory 512 and trajectory 514, respectively, as well as the location of the intersection point of trajectory 512 and trajectory 514 can depend on the physical dimensions (e.g., length, width, etc.) of vehicle 502 and object 506. In some instances, for example when the time difference between vehicle 502 and object 506 passing through the intersection point is large, AV compute 504 (e.g., machine learning model executing therein) can model the vehicle 502 and object 506 as a point entity, and as such the positions of the points can represent the spatiotemporal locations of vehicle 502 and object 506 along trajectory 512 and trajectory 514, respectively. As another example, in particular when vehicle 502 and object 506 pass through the intersection point within a short time period, AV compute 504 can model vehicle 502 and object 506 as two-dimensional (e.g., squares, rectangles, etc.) or three-dimensional entities. AV compute 504 can then use any point of the 2D or 3D entities (e.g., front, middle, back, etc.) as the positions of the spatiotemporal locations of vehicle 502 and object 506. For instance, AV compute 504 can use the front-most point of the 2D or 3D entity representing vehicle 502 as the position of the spatiotemporal location of vehicle 502 and the back-most point of the 2D or 3D entity representing object 506 as the position of the spatiotemporal location of object 506. In such cases, AV compute 504 can determine object 506 to have crossed vehicle 502 (e.g., without a collision) when the front-most point passes through the intersection point of trajectory 512 and trajectory 514 prior to the back-most point arriving at the intersection point.

In some embodiments, AV compute 504 determines whether object 506 crosses vehicle 502 by determining and comparing the spatiotemporal locations of vehicle 502 and object 506 when trajectory 512 and trajectory 514 intersect. As mentioned above, AV compute 504 determines spatiotemporal location P1b 508b of vehicle 502 based on trajectory 512 and spatiotemporal location P2b 510b of object 506 based on trajectory 514, spatiotemporal locations P1b 508b and P2b 510b being the predicted spatiotemporal locations of vehicle 502 and object 506 when trajectory 512 and trajectory 514 intersect. AV compute 504 then determines object 506 has crossed vehicle 502 if object 506 has passed through the intersection point of trajectory 512 and trajectory 514 prior to the arrival of vehicle 502 at the same intersection point, and if the differences between the positions and timestamps associated with spatiotemporal locations P1b 508b and P2b 510b satisfy respective thresholds.

For example, AV compute 504 determines that object 506 has passed through intersection point P1b 508b prior to the arrival of vehicle 502 at the same intersection points. Further, AV compute 504 determines that the distance difference between the positions associated with spatiotemporal locations P1b 508b and P2b 510b satisfies (e.g., is less than) a distance threshold. In addition, AV compute 504 also determines that the time difference between the timestamps associated with spatiotemporal locations P1b 508b and P2b 510b satisfies (e.g., is less than) a time threshold. AV compute 504 determines that object 506 has crossed vehicle 502 if both the distance difference and the time difference have satisfied respective thresholds (e.g., the distance difference and the time difference are less than the distance threshold and the time threshold, respectively), and that object 506 has passed through the intersection point of trajectory 512 and trajectory 514 prior to the arrival of vehicle 502 at the same intersection point. The condition that the distance difference and time difference be less than the respective thresholds allows AV compute 504 to filter out scenarios where vehicle 502 passes through the intersection point a long time (e.g., greater than the threshold time) after object 506 passes.

In some embodiments, the distance difference and the time difference may not have satisfied the respective thresholds (e.g., the distance difference and the time difference can be greater than the distance threshold and the time threshold, respectively) and AV compute 504 may still consider object 506 as having crossed vehicle 502 if the intersection point is part of or at least substantially close to a crosswalk. For example, vehicle 502, which is stopped at a crosswalk, may start moving again after an amount of time greater than the time threshold has passed since object 506 crossed the crosswalk (e.g., and as such vehicle 502). As another example, object 506 may have travelled a distance greater than the threshold distance since object 506 has crossed the crosswalk (e.g., and as such vehicle 502). In such cases, despite the distance difference and/or the time difference being greater than the respective thresholds, AV compute 504 may consider this crossing as a valid crossing (e.g., AV compute 504 can set the distance threshold and/or the time threshold associated with a crosswalk higher so that most or all objects crossing a vehicle that is stopped at the crosswalk are considered to have performed valid crossings.

In some embodiments, AV compute 504 determines that object 506 has not crossed vehicle 502 if trajectory 512 and trajectory 514 have not intersected, object 506 has not passed through the intersection point of trajectory 512 and trajectory 514 prior to the arrival of vehicle 502 at the same intersection point, and/or one or both of the distance difference and the time difference fail to satisfy the respective thresholds.

In some embodiments, AV compute 504 can establish whether the determination that object 506 has crossed or has not crossed vehicle 502 is a false positive or a false negative, respectively, by comparing the predicted trajectories 512 and 514 to the respective "ground truth" trajectories of vehicle 502 and object 506. A false positive object crossing refers to when the predicted trajectories 512 and 514 indicate that object 506 crosses vehicle 502, for example as discussed above, while the ground truth trajectories of vehicle 502 and object 506 indicate that object 506 does not cross vehicle 502. A false negative object crossing refers to when the predicted trajectories 512 and 514 indicate that object 506 does not cross vehicle 502, while the ground truth trajectories of vehicle 502 and object 506 indicate that object 506 crosses vehicle 502.

In some embodiments, as discussed above, AV compute 504 identifies the predictions of trajectory 512 and trajectory 514 that are associated with false positive and/or false negative object crossings, and filter out these "false object crossings" predictions from the set of trajectory predictions for vehicle 502 and object 506. AV compute 504 can use the filtered out set of trajectories associated with the "false object crossings" predictions and/or the rest of the predicted trajectories to train the machine learning model therein that predicts trajectories (e.g., such as trajectory 512 and trajectory 514) for vehicle 502 and object 506. For example, AV compute 504 can train the machine learning model to predict the probability that object 506 is going to cross vehicle 502. As another example, AV compute 504 can train the machine learning model to compute the probability of predicted vehicle and object trajectories being associated with false positive or false negative object crossings.

In some embodiments, AV compute 504 determines a vehicle control for controlling the movement or motion of vehicle 502 based on the predicted trajectory 512 and/or the predicted trajectory 514. Examples of vehicle control include but are not limited to changing the speed of vehicle 502 (e.g., increasing or decreasing the speed), maintaining the speed of vehicle 502, changing the direction of motion of vehicle 502, maintaining the direction of vehicle 502, and/or the like. For example, as discussed above, AV compute 504 can predict the trajectory 512 of vehicle 502 and the trajectory 514 of object 506, and determine that object 506 would cross vehicle 502. In such cases, AV compute 504 can determine a vehicle control to control the movement of the vehicle 502 based on the predicted trajectories 512, 514 (e.g., and the determination, for example, of object 506 crossing vehicle 502, based on the predictions). For instance, the vehicle control may include changing the direction and speed of the movement of vehicle 502 such that vehicle 502 has the trajectory 516 that crosses the trajectory 518 of object 506. That is, AV compute 504 determines a vehicle control that is configured to control the movement of vehicle 502 such that the trajectory 516 of vehicle 502 intersects the trajectory 518 of object 506 at spatiotemporal location P2c 510c of object 506 when vehicle 502 is at spatiotemporal location P1c 508c after having passed the intersection point of the trajectories 516 and 518 (e.g., which corresponds to spatiotemporal location P2c 510c of object 506).

In some embodiments, vehicle compute 504 trains a machine learning model implemented therein based on the vehicle control, predicted trajectory 512 of vehicle 502, predicted trajectory 514 of object 506, actual trajectory 516 of vehicle 502 that is the result of the vehicle control, and/or actual trajectory 518 of object 506. For example, the machine learning model can be trained to predict or make improved predictions about the trajectories of the vehicle 502 and/or the object 506. Further, as another example, the machine learning model can be trained to predict or improve its predictions about the likelihood of the object 506 crossing the vehicle 502, i.e., the likelihood of the trajectory of the object 506 crossing the intersection point of the trajectories of the vehicle 502 and the object 506 before the vehicle 502 arrives at the intersection point.

Figure 6:
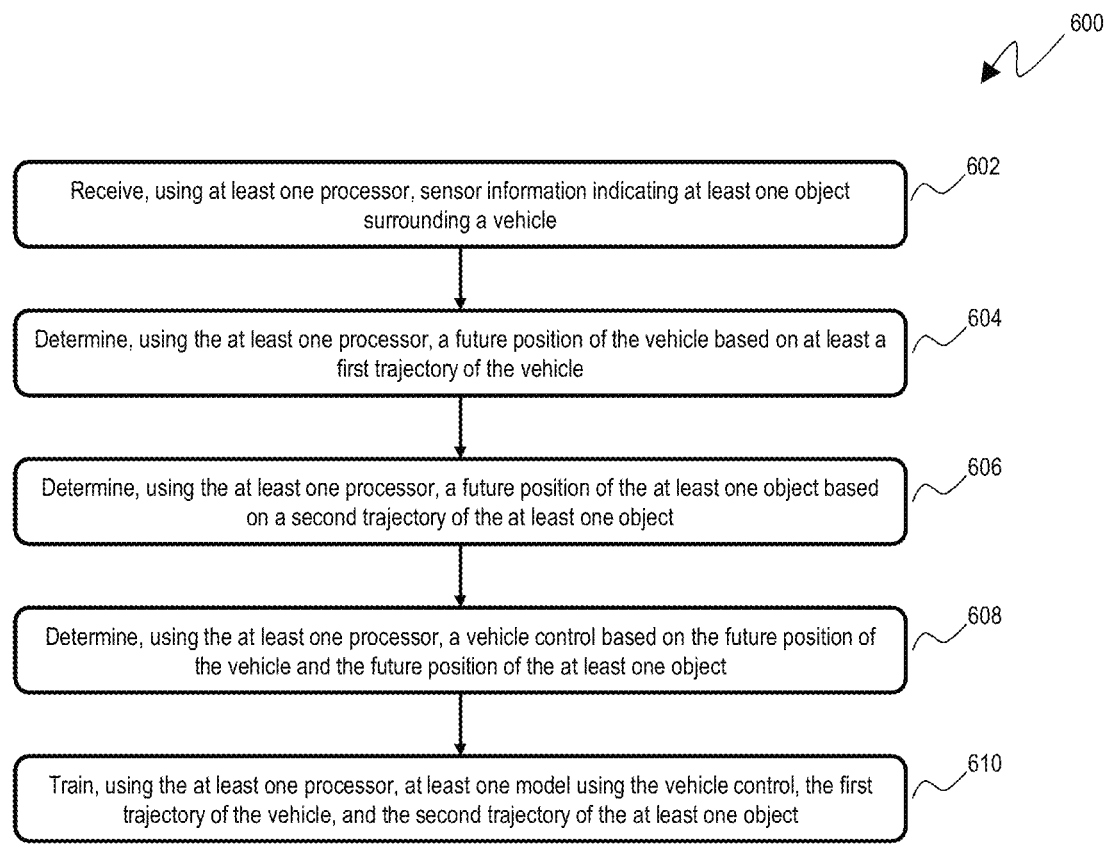
FIG. 6 is a flowchart of an example of a process for predicting and controlling object crossings of vehicle routes.

Referring now to FIG. 6, illustrated is a flowchart of a process 600 for predicting vehicle crossing and yielding. In some embodiments, one or more of the steps described with respect to process 600 are performed (e.g., completely, partially, and/or the like) by the planning system 404 of the autonomous vehicle compute 400. Additionally, or alternatively, in some embodiments one or more steps described with respect to process 600 are performed (e.g., completely, partially, and/or the like) by another device or group of devices separate from or including the planning system 404 such as the control system 408 of the autonomous vehicle compute 400.

At block 602, sensor information indicating at least one object surrounding a vehicle is received. For example, the sensor information is captured from at least one of a radar sensor, an imaging device, a global positioning system (GPS), and a LiDAR sensor.

At block 604, a future position of the vehicle is determined based on at least a first trajectory of the vehicle.

At block 606, a future position of the at least one object is determined based on a second trajectory of the at least one object.

At block 608, a vehicle control is determined based on the future position of the vehicle and the future position of the at least one object.

At block 610, at least one model is trained using the vehicle control, the first trajectory of the vehicle, and the second trajectory of the at least one object.

In some embodiments of process 600, a first timestamp associated with the future position of the vehicle is determined. Further, a second timestamp associated with the future position of the at least one object is determined. Further, a first difference between the future position of the vehicle and the future position of the at least one object is determined. Further, a second difference between the first timestamp and the second timestamp is determined. Further, the vehicle control is determined based at least on whether the first difference and the second difference satisfy a respective threshold.

In some embodiments of process 600, the future position of the vehicle and the future position of the at least one object are additionally based on one or more dimensions of the vehicle and/or the at least one object.

In some embodiments of process 600, a control signal related to the vehicle control is generated based on the trained model to operate the vehicle.

In some embodiments of process 600, the vehicle control is at least one of a change in speed, a change in a steering angle, maintaining a current speed of the vehicle, and maintaining a current direction of the vehicle.

In some embodiments of process 600, the future position of the vehicle and the future position of the at least one object are determined by determining whether the future position of the vehicle and the future position of the at least one object intersect. Further, in response to determining that the future position of the vehicle and the future position of the object intersect, the vehicle control is selected as the change in speed or the change in the steering angle and the control signal is generated based on the selected vehicle control to operate the vehicle. In addition, in response to determining that the future position of the vehicle and the future position of the object do not intersect, the vehicle control is selected as the maintaining of the current vehicle state and the control signal is generated based on the selected vehicle control to operate the vehicle.

In some embodiments of process 600, the at least one model is trained by continuously determining the first trajectory of the vehicle and the second trajectory of the at least one object. For example, the first trajectory of the vehicle and the second trajectory of the at least one object are continuously determined about every 8 seconds.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
   receiving sensor information indicating at least one object surrounding a vehicle;
   determining a future position of the vehicle based on at least a first trajectory of the vehicle;
   determining a future position of the at least one object based on a second trajectory of the at least one object, wherein the second trajectory of the at least one object crosses the first trajectory of the vehicle or yields to the vehicle;
   determining a vehicle control based on the future position of the vehicle, the future position of the at least one object, and a determination of the second trajectory of the at least one object crossing the first trajectory of the vehicle or yielding to the vehicle;
   training at least one model to predict trajectories of vehicles and objects comprising a likelihood of an object trajectory crossing a vehicle trajectory, wherein the at least one model is trained based on the vehicle control, the first trajectory of the vehicle, and the second trajectory of the at least one object, wherein false object crossings are filtered from the first trajectory of the vehicle and the second trajectory of the at least one object; and
   controlling an autonomous vehicle based on an output of the trained at least one model.

2. The method of claim 1, further comprising:
   determining a first timestamp associated with the future position of the vehicle;
   determining a second timestamp associated with the future position of the at least one object;
   determining a first difference between the future position of the vehicle and the future position of the at least one object;
   determining a second difference between the first timestamp and the second timestamp; and
   determining the vehicle control based at least on whether the first difference and the second difference satisfy a respective threshold.

3. The method of claim 1, wherein the future position of the vehicle and the future position of the at least one object are additionally based on one or more dimensions of the vehicle and/or the at least one object.

4. The method of claim 1, further comprising:
   generating a control signal related to the vehicle control based on the trained model to operate the vehicle.

5. The method of claim 1, wherein the vehicle control is at least one of a change in speed, a change in a steering angle, maintaining a current speed of the vehicle, and maintaining a current direction of the vehicle.

6. The method of claim 1, wherein the determining of the future position of the vehicle and the future position of the at least one object further includes:
determining whether the future position of the vehicle and the future position of the at least one object intersect.

7. The method of claim 6, further comprising:
in response to determining that the future position of the vehicle and the future position of the object intersect, selecting the vehicle control as a change in speed or a change in a steering angle; and
generating the control signal based on a selected vehicle control to operate the vehicle.

8. The method of claim 6, further comprising:
in response to determining that the future position of the vehicle and the future position of the object do not intersect, selecting the vehicle control as maintaining of a current vehicle state; and
generating the control signal based on a selected vehicle control to operate the vehicle.

9. The method of claim 1, wherein the training of the at least one model includes:
training the at least one model by continuously determining the first trajectory of the vehicle and the second trajectory of the at least one object.

10. The method of claim 9, wherein the first trajectory of the vehicle and the second trajectory of the at least one object are continuously determined about every 8 seconds.

11. The method of claim 1, wherein the sensor information is captured from at least one of a radar sensor, an imaging device, a global positioning system (GPS), and a LiDAR sensor.

12. A system, comprising:
at least one non-transitory storage media storing instructions; and
at least one processor coupled to the at least one non-transitory storage media and configured to read the instructions from the at least one non-transitory storage media to cause the system to perform operations comprising:
receiving sensor information indicating at least one object surrounding a vehicle;
determining a future position of the vehicle based on at least a first trajectory of the vehicle;
determining a future position of the at least one object based on a second trajectory of the at least one object, wherein the second trajectory of the at least one object crosses the first trajectory of the vehicle or yields to the vehicle;
determining a vehicle control based on the future position of the vehicle, the future position of the at least one object, and a determination of the second trajectory of the at least one object crossing the first trajectory of the vehicle or yielding to the vehicle;
training at least one model to predict trajectories of vehicles and objects comprising a likelihood of an object trajectory crossing a vehicle trajectory, wherein the at least one model is trained based on the vehicle control, the first trajectory of the vehicle, and the second trajectory of the at least one object, wherein false object crossings are filtered from the first trajectory of the vehicle and the second trajectory of the at least one object; and
controlling an autonomous vehicle based on an output of the trained at least one model.

13. The system of claim 12, wherein the operations further comprise:
determining, using the at least one processor, a first timestamp associated with the future position of the vehicle;
determining, using the at least one processor, a second timestamp associated with the future position of the at least one object;
determining, using the at least one processor, a first difference between the future position of the vehicle and the future position of the at least one object;
determining, using the at least one processor, a second difference between the first timestamp and the second timestamp; and
determining the vehicle control based at least on whether the first difference and the second difference satisfy a respective threshold.

14. The system of claim 12, wherein the future position of the vehicle and the future position of the at least one object are additionally based on one or more dimensions of the vehicle and/or the at least one object.

15. The system of claim 12, wherein the operations further comprise:
generating, using the at least one processor, a control signal related to the vehicle control based on the trained model to operate the vehicle.

16. The system of claim 12, wherein the vehicle control is at least one of a change in speed, a change in a steering angle, maintaining a current speed of the vehicle, and maintaining a current direction of the vehicle.

17. The system of claim 12, wherein the determining of the future position of the vehicle and the future position of the at least one object further includes:
determining, using the at least one processor, whether the future position of the vehicle and the future position of the at least one object intersect.

18. The system of claim 12, wherein the training of the at least one model includes:
training, using the at least one processor, the at least one model by continuously determining the first trajectory of the vehicle and the second trajectory of the at least one object.

19. A non-transitory machine-readable medium having stored thereon machine-readable instructions executable to cause performance of operations comprising:
receiving sensor information indicating at least one object surrounding a vehicle;
determining a future position of the vehicle based on at least a first trajectory of the vehicle;
determining a future position of the at least one object based on a second trajectory of the at least one object, wherein the second trajectory of the at least one object crosses the first trajectory of the vehicle or yields to the vehicle;
determining a vehicle control based on the future position of the vehicle, the future position of the at least one object, and a determination of the second trajectory of the at least one object crossing the first trajectory of the vehicle or yielding to the vehicle;
training at least one model to predict trajectories of vehicles and objects comprising a likelihood of an object trajectory crossing a vehicle trajectory, wherein the at least one model is trained based on the vehicle control, the first trajectory of the vehicle, and the second trajectory of the at least one object, wherein false object crossings are filtered from the first trajectory of the vehicle and the second trajectory of the at least one; and controlling an autonomous vehicle based on an output of the trained at least one model.

20. The non-transitory machine-readable medium of claim 19, wherein the sensor information is captured from at least one of a radar sensor, an imaging device, a global positioning system (GPS), and a LiDAR sensor.

* * * * *

UNITED STATES PATENT AND TRADEMARK OFFICE
CERTIFICATE OF CORRECTION

PATENT NO. : 12,448,006 B2  
APPLICATION NO. : 17/705035  
DATED : October 21, 2025  
INVENTOR(S) : Henggang Cui Page 1 of 1

It is certified that error appears in the above-identified patent and that said Letters Patent is hereby corrected as shown below:

In the Claims

Column 23, Line 3, In Claim 19, delete "one;" and insert -- one object; --.

Signed and Sealed this  
Twenty-seventh Day of January, 2026

John A. Squires  
*Director of the United States Patent and Trademark Office*